Figure 1:
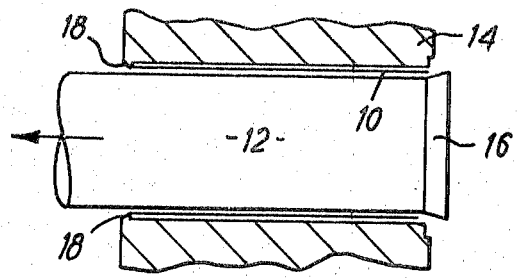

United States Patent [19]

Constable et al.

[11] 4,401,232
[45] Aug. 30, 1983

[54] INTEGRALLY FORMED INJECTION MOULDED PLASTICS CONTAINER

[75] Inventors: Michael J. Constable, Pucklechurch; David S. Hamblin, Portishead, both of England

[73] Assignee: DRG (UK) Limited, Bristol, England

[21] Appl. No.: 203,370

[22] Filed: Nov. 3, 1980

[30] Foreign Application Priority Data

Nov. 9, 1979 [GB] United Kingdom ............... 7938931

[51] Int. Cl.³ .................... B65D 1/40; B65D 25/14
[52] U.S. Cl. ............................. 220/450; 229/1.5 B; 229/3.5 MF; 264/262
[58] Field of Search ............... 220/450; 229/3.5 MF, 229/3.1, 1.5 B, 5.6; 264/261, 262, 247, 269

[56] References Cited

U.S. PATENT DOCUMENTS

| | | | |
|---|---|---|---|
| 3,215,325 | 11/1965 | Shappell et al. | 229/3.1 X |
| 3,260,777 | 7/1966 | Brandt | 264/262 |
| 3,298,559 | 1/1967 | Lurie | 229/3.5 MF |
| 3,476,852 | 11/1969 | Shattuck | 264/269 |
| 3,524,568 | 8/1970 | Nughes | 229/5.6 X |
| 4,021,524 | 5/1977 | Grimsley | 264/262 X |

FOREIGN PATENT DOCUMENTS

| | | | |
|---|---|---|---|
| 46-17593 | 5/1971 | Japan | 264/262 |
| 1582296 | 1/1981 | United Kingdom . | |

*Primary Examiner*—Allan N. Shoap
*Attorney, Agent, or Firm*—Larson and Taylor

[57] ABSTRACT

An integrally formed injection moulded tubular plastics container body open at one end and closed at the other end. A sleeve (10) of sheet material lies outwardly of the injection moulded plastics (28) of the tubular wall and a layer (20) of sheet material lies inwardly of the injection moulded plastics (30) of the end wall, both sheets (10,20) being secured to the plastics (28,30) during the moulding operation. In producing the container, the sleeve (10) is inserted into the female mould and the other sheet (20) is inserted so as to lie transversely across the mould, partway along the sleeve, and hold the sheet to the mould walls while the male mould member is inserted, carrying the transverse sheet (20) to the end of the mould.

7 Claims, 5 Drawing Figures

U.S. Patent  Aug. 30, 1983  4,401,232

INTEGRALLY FORMED INJECTION MOULDED PLASTICS CONTAINER

This invention relates to injection moulded plastics containers.

Moulded plastics containers have the disadvantage that it is difficult to provide satisfactory printing or decoration of the exterior surface, as plastics does not readily take certain types of print, but more importantly because it is usually necessary to apply the print to the formed container. Another disadvantage of most thin walled plastics containers is that the material tends to be translucent and is not a good barrier to gases, vapours and light, and this can be a disadvantage for example with foodstuffs where the presence of light and oxygen may reduce the shelf life.

The present invention provides an integrally formed injection moulded plastics container having a tubular body closed at one end, the tubular wall of the body having a sleeve of sheet material outwardly of the injection moulded plastics and secured thereto during the moulding operation, and the end closure having a layer of sheet material inwardly of the injection moulded plastics and secured thereto during the moulding operation.

The end closure sheet layer preferably has a marginal portion turned axially so as to form part of the tubular wall of the body. At least one of the sheet materials may be of paper, for example with pre-printed decoration or information, this being especially appropriate for the side wall, or the end wall if that is more likely to be viewed in use. The sheet material may comprise a layer of barrier material such as aluminium foil. The sheet material may be in the form of a laminate; for example, aluminium foil with a thin film of plastics material on each side, the film on one side bonding to the injection moulded plastics, and the film on the other side providing an outer protective layer for the foil. The laminate may comprise a paper layer with or without a barrier layer or a plastics film layer.

In a method of making such a container, the preformed sleeve of sheet material is inserted into the female mould, the pre-cut end layer of sheet material is then inserted into the mould so as to extend transversely across the mould in contact with the inside surface of the sleeve part-way along the sleeve, thereby tending to hold the sleeve against the walls of the female mould, and then the male mould is inserted fully into the female mould, in the course of which its leading end carries the end layer of sheet material to the end of the mould, and thereafter plastics material is injection moulded from that end so that it flows over the outside of the end closure sheet and over the inside of the sleeve of sheet material.

Figure 2:
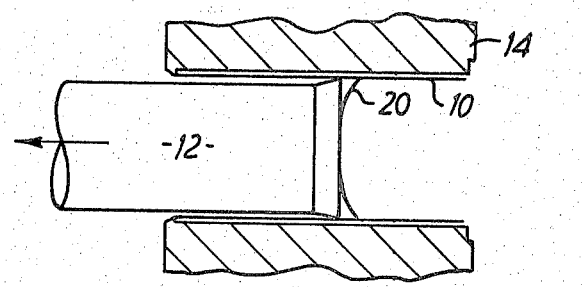
Figure 3:
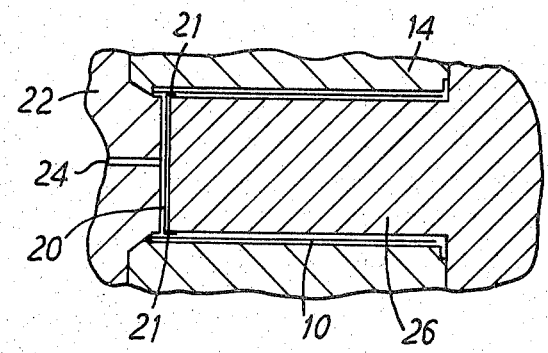
Figure 5:
Figure 4:
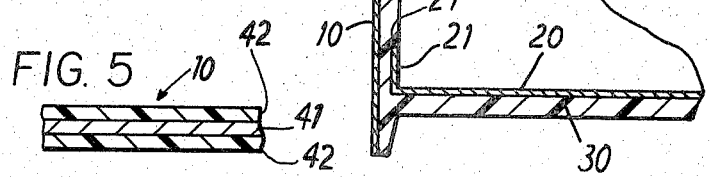

In order that the invention may be more clearly understood, one embodiment will now be described with reference to the accompanying drawings, wherein:

FIGS. 1 to 3 show diagrammatically cross-sections through the mould in successive stages of forming the container, FIG. 4 shows the cross-sectional detail of one corner of the finished container, and FIG. 5 is an enlarged diagrammatic cross sectional view of a sheet material useful in the container of FIGS. 1-4.

Referring to the drawings and firstly to FIG. 1; a sleeve 10 of sheet material is wrapped around a mandrel 12 and held there for example by suction while the mandrel carries it into a female mould 14 which is open at both ends. Then the suction is released and the natural resiliency of the sheet material causes the sleeve to spring away from the mandrel and against the inside surface of the female mould. Then the mandrel is partially withdrawn to the position shown in FIG. 2. During this operation the sleeve is further urged towards the wall of the mould by the wiping action of a frusto-conically enlarged head portion 16 of the mandrel, and a slight lip 18 at the mouth of the mould prevents the sleeve coming out of the mould during withdrawal of the mandrel.

At the stage of partial withdrawal shown in FIG. 2, the mandrel is stopped and a disc 20 of sheet material is inserted into the female mould from the open end so as to lie up against the end of the mandrel. The disc is a little larger than the internal cross-section of the mould cavity, so that it lies transversely to the mould in a somewhat flexed condition pressing against the inside surface of the sleeve, part-way along the sleeve, urging it against the inside surface of the mould. Then the mandrel is fully withdrawn and a male mould member 26 is inserted into the female mould member 14 from the other end. In the course of this movement it engages the transverse sheet 20 and carries it down to the end of the mould as shown in FIG. 3. This also causes the marginal portion 21 of the oversized sheet 20 to be turned axially alongside the male member 26. The open end of the female mould vacated by the mandrel is closed by an end mould member 22, which contains a gate 24 for injecting molten plastics into the mould.

Then molten plastics is injected into the mould, where it flows over the outside surface of the end sheet 20, between the marginal portion of the end sheet and the sleeve 10, and over the inside surface of the sleeve 10. Thus there is produced an integral injection moulded plastics container having a tubular wall, closed at one end and open at the other end. As can be seen from FIG. 4, which shows a cross-section of a corner region at the closed end, the sleeve 10 lies on the outside surface of the injection moulded plastics of the tubular body 28, and the end sheet 20 lies on the inside surface of the injection moulded plastics of the end closure 30. It will also be apparent from the foregoing that end closure sheet material 20 is positioned entirely within the mould cavity formed between mould members 14 and 22 on the one hand and mould member 26 on the other, with one face of the sheet material lying against mould member 26. It will thus be readily apparent that the peripheral edge 27 of end closure sheet material 20 becomes embedded in the plastics material injected into the mould cavity.

We claim:

1. An integrally formed injection moulded plastics container having a self-supporting tubular body closed by a self-supporting end closure at one end, the tubular body having a sleeve of sheet material outwardly of the injection moulded plastics, said sleeve being substantially coextensive with the outer surface of said tubular body and being secured thereto during the moulding operation, said sleeve of sheet material not extending over the outer surface of the end closure whereby the outer surface of the end closure comprises the plastics material, and the end closure having a layer of sheet material inwardly of the injection moulded plastics and secured thereto during the moulding operation, said layer of sheet material being substantially coextensive with said end closure and extending over the tubular body at most in a marginal portion turned axially whereby the inner surface of the tubular body comprises the plastics material and any marginal portion of said layer of sheet material, said injection moulded plastics material forming the tubular body and the end closure being formed in one piece, the peripheral edge of said layer of end closure sheet material being embedded in said injected moulded plastics material, and said injection moulded plastics material forming said tubular body and said end closure being thicker in cross section than the sheet material forming said sleeve and said layer.

2. A container according to claim 1 wherein the end closure layer of sheet material has a marginal portion turned axially so as to form part of the inner surface of the tubular body.

3. A container according to claim 2 wherein the inner surface of said marginal portion is co-planar with the plastics surface of the inner surface of said tubular body.

4. A container according to claim 1 wherein each of the sleeve sheet material and the end closure sheet material comprises a barrier layer.

5. A container according to claim 4 wherein said barrier layer comprises a laminate of metal foil with plastics film on each side, whereby the plastics film on one side is bonded to the injection moulded plastics material during the moulding process and the plastics film on the other side is exposed to protect the metal foil layer.

6. A container according to claim 4 wherein said barrier layer comprises a metal foil.

7. A container according to claim 1 wherein at least one of the sheet materials comprises a layer of paper with printing.

* * * * *